United States Patent [19]

Cafiero et al.

[11] Patent Number: 4,584,690
[45] Date of Patent: Apr. 22, 1986

[54] ALTERNATE MARK INVERT (AMI) TRANSCEIVER WITH SWITCHABLE DETECTION AND DIGITAL PRECOMPENSATION

[75] Inventors: Luca Cafiero, Palo Alto; Mario Mazzola, Campbell; Massimo Prati, Palo Alto, all of Calif.

[73] Assignee: D.A.V.I.D. Systems, Inc., Sunnyvale, Calif.

[21] Appl. No.: 607,998

[22] Filed: May 7, 1984

[51] Int. Cl.$^4$ .................. H04B 1/62; H04L 25/34; H03K 5/08
[52] U.S. Cl. ........................... 375/18; 375/60; 375/76; 375/101; 375/110; 360/40; 307/360
[58] Field of Search ................ 375/18, 20, 34, 60, 375/76, 95, 101, 110; 360/40, 43; 307/360

[56] References Cited

U.S. PATENT DOCUMENTS

| | | | |
|---|---|---|---|
| 3,459,964 | 8/1969 | Yoshida et al. | 375/76 |
| 3,824,498 | 7/1974 | McBride | 375/62 |
| 4,007,382 | 2/1977 | Warberg | 307/360 |
| 4,041,239 | 8/1977 | Haass | 375/60 |
| 4,071,692 | 1/1978 | Weir et al. | 375/20 |
| 4,157,509 | 6/1979 | Zielinski | 375/76 |
| 4,291,277 | 9/1981 | Davis et al. | 375/60 |
| 4,339,724 | 7/1982 | Feher | 328/164 |
| 4,427,901 | 1/1984 | Tomuro | 307/268 |

OTHER PUBLICATIONS

"X31: Delivering High Speed Data to the Desk Top", Anderson et al., *Telesis*, vol. 12, No. 2, 1985, pp. 41–46.

*Primary Examiner*—Benedict V. Safourek
*Assistant Examiner*—Raymond C. Glenny
*Attorney, Agent, or Firm*—Townsend & Townsend

[57] ABSTRACT

A high-speed digital transceiver is provided for use in a PBX environment comprising twisted-pair wire cables interconnecting like transceivers, each transceiver being operative to exchange voice, data and control information in a packetized format over a common twisted-pair cable. Specifically, each transceiver communicates packetized pulse code modulated information in pure Alternate Mark Inverted (AMI) coding, that is, without the introduction of bipolar violation pulses to provide timing. Frame synchronization is acquired on the first pulse by the use of a digital circuit deriving synchronization from a local high-speed clock. The use of a high-speed clock-driven digital circuit for synchronization acquisition eliminates the need for a phase-locked loop synchronization scheme and its concomitant finite acquisition delay. In addition, a receiving section employs a threshold selecting circuit which switches or makes thresholds in response to an expectation of the absence any bipolar violation in the transmitted signal. The effect of intersymbol interference are further minimized by provision of digital precompensation in the transmitted signal to maximize the slew rate between consecutive pulses. The precompensation scheme is based on a knowledge of the bit pattern and the amount of energy contained in a sequence of bits.

8 Claims, 13 Drawing Figures

ALTERNATE MARK INVERT (AMI) TRANSCEIVER WITH SWITCHABLE DETECTION AND DIGITAL PRECOMPENSATION

BACKGROUND OF THE INVENTION

This invention relates to digital telecommunications and more particularly to digital telecommunications in the megabit/second data rate range using a standard telephone twisted-pair cable a few thousand feet in length. The invention is primarily for use in local loop digital subscriber telephone systems capable of supporting voice, data and image transmission. However, apparatus according to the invention may also be used in connection with data acquisition and digital control tasks.

The transmission of information in digital form at frequencies exceeding one megabit/second has in the past generally been accomplished by means of expensive cabling systems, such as coaxial cable, shielded twisted-pair cable, for fiberoptic cable. In the past, such systems have generally required sophisticated data recovery techniques including analog equalization and phase synchronization.

While the use of such known techniques can be justified for communication between computer equipment where expense is not a primary factor, there is nevertheless a need to provide a relatively inexpensive and yet reliable system optimized for use with inexpensive, often previously installed, standard twisted-pair wiring. A transceiver for this purpose must not only meet economic criteria but also satisfy stringent bit error rate standards, radiation standards, and cross-talk standards.

There is a growing need to provide for the interface of telephones with various types of digital communication equipment, including personal computers and the like, to previously installed twisted-pair wiring. One possible technique for implementing shared voice and data communication is through the use of packet switching wherein packets contain voice, data or control and signaling information. To be effective, packet switched communications must be at a rate high enough to allow transmission of voice signals with minimal delays in order to permit conversational communication. In a PBX environment where it is desired to minimize the number of wires, it is preferable to provide power over the same physical wires which carry data. This imposes the requirement that digital data be in an ac form free of dc offsets. The transmitters and receivers can thus be coupled to the transmission medium by means of pulse transformers, and data and coding schemes such as alternate mark inversion (AMI) must be employed. While AMI encoding schemes are appropriate for transformer coupled lines, AMI schemes are not self-clocking so synchronization is easily lost. The conventional solution is to provide modified AMI schemes to take into account arbitrarily long sequences of zeros which result in arbitrarily long periods between pulses. The modified schemes involve insertion of intentional bipolar violations in the data stream. Detection schemes for such systems are generally complex and expensive.

High frequency transmission system operating over distances exceeding a few hundred feet generally adopt a self-encoding scheme and employ phase locked loop synchronization techniques with continuous frequency and/or phase tracking. Phase locked loop synchronization techniques require a finite acquisition time at the beginning of each frame, so bandwidth constraints and delays seriously hinder use in a high-speed environment with frequent synchronization. Moreover, four wire systems are frequently required to achieve full duplex capability, since in prior art schemes, line turnaround is slowed by synchronization delays.

Another problem noted, particularly with the standard twisted-pair cabling over a length of several hundred feet, is the low pass filter effect caused by the lines themselves. The medium dependent low pass filter characteristic causes distortion which increases the problem of intersymbol interference when data rates approach the bandwidth of the medium. In the past, the low pass filter characteristics have been compensated for at the receiving end of a channel by means of analog equalization to achieve acceptable bit error rates. Analog equalization does not lend itself to digital integration, thus reducing any advantages gained by large scale integration of other circuits. Still further, intersymbol interference imposes conflicting requirements on the level detection threshold used to distinguish between logic values ONE and ZERO. For example, the voltage threshold used to separate pulses from the absence of pulses is preferably as low as possible in order to compensate for effect of intersymbol interference. Transmission of a pulse followed by the absence of pulses may be detected incorrectly at the receiving end as consecutive pulses if the threshold voltage used to separate the pulses from the absence of pulses is set at a low value. This false reading is due to the relatively long discharge time of a transmission medium acting as a low pass filter. Straightforward detection schemes are further complicated because a DC free coding scheme such as AMI is non-self clocking. A clock signal is frequently embedded in an AMI code for synchronization purposes. Unfortunately a clock signal may create a DC artifact.

These and other problems have been addressed and overcome in the development of a high-speed digital transceiver suitable for voice and data interchange in a PBX environment.

SUMMARY OF THE INVENTION

A digital transceiver is provided to exchange voice and data via a packet protocol in a PBX environment. The environment comprises twisted wire cables interconnecting like transceivers communicating in the M bit/sec. range. Specifically, each transceiver communicates packetized pulse code modulated information in pure Alternate Mark Inverted (AMI) coding. Frame synchronization is achieved by the use of a variable length, frequently synchronized window deriving synchronization from a high-speed counter driven by a high-speed clock. The use of a high-speed counter for synchronization eliminates the need for a phase-locked loop synchronization scheme and its concomitant finite phase acquisition delay. In addition, the receiving section of the transceiver employs means for selecting between detection means each coupled with a threshold. Switching is effected in response to an expectation of the absence any bipolar violation in the transmitted signal. The effects of intersymbol interference are further minimized by provision of digital precompensation in the transmitted signal to maximize the slew rate between consecutive bits. The precompensation scheme is based on a knowledge of the bit pattern and the amount of energy contained in a sequence of bits.

The invention is implemented in a packetized full duplex two-wire voice and data communication system employing ping-pong protocol having a packet size compatible with the DS1 (T1) pulse code modulated data communication frame. Up to 16 bytes per 125 microsecond frame may be transmitted, the frame corresponding to maximum data rate of 1.024 M bit/sec. The actual transmission rate over a twisted-pair cable is on the order of 2 M bit/sec. so as to permit full duplex two-wire communication over a single twisted-pair cable. Full duplex capability is obtained by transmitting a burst of information in one direction at one frame and thereafter a burst of information in the opposite direction at the next frame. Synchronization must be renewed with each frame, and in the particular embodiment herein disclosed, every 125 microseconds. The use of a frame-synchronized clock based on a high-speed counter makes possible rapid synchronization on a frequent basis.

The invention will be better understood by reference to the following detailed description taken in connection with the accompanying drawings.

DESCRIPTION OF SPECIFIC EMBODIMENTS

Figure 1:
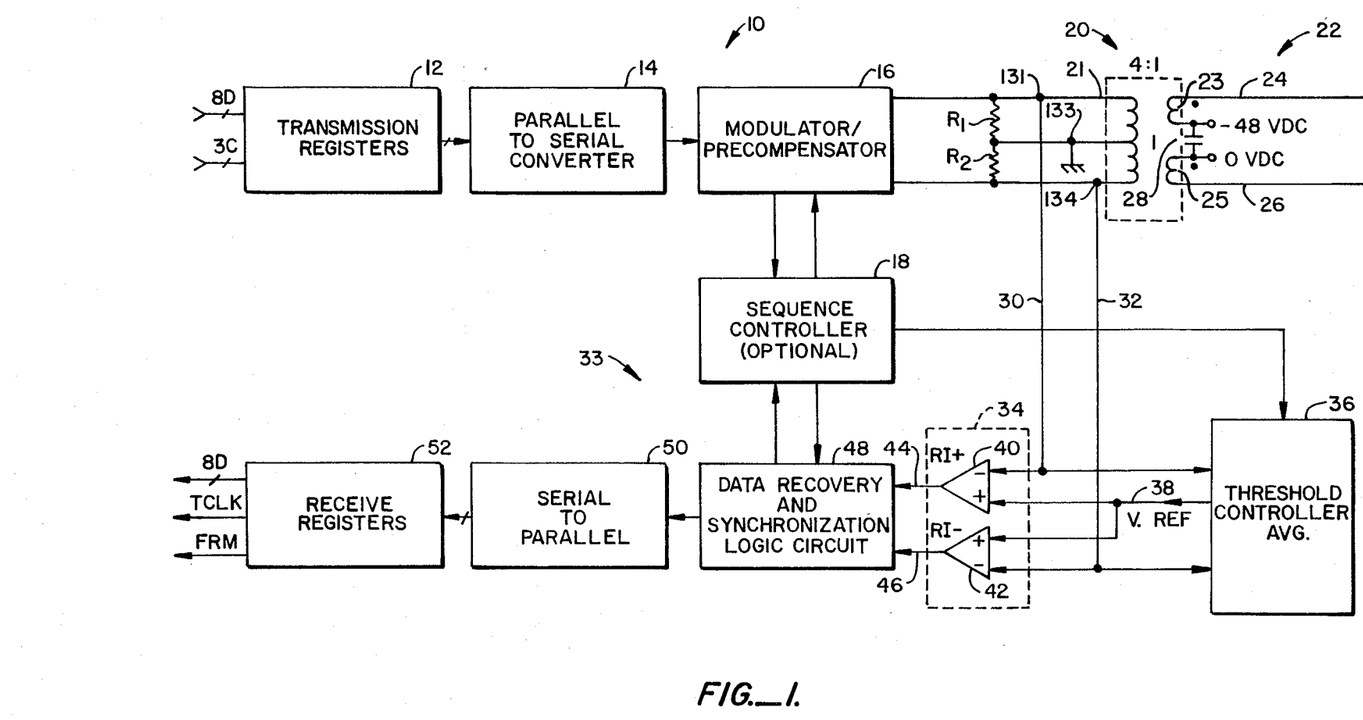
FIG. 1 is a block diagram of a transceiver in accordance with the invention.

FIG. 1 shows a block diagram of a digital transceiver 10 according to the present invention. Input comprises eight data lines and three control lines coupled to a comensurate number of transmission registers 12; these transmission registers 12 are in turn coupled to a parallel to serial converter 14 wherein all signals received on parallel data lines are converted to serial format under clock control (clock not shown). The output of the parallel to serial converter 14 is applied to a modulator and precompensator circuit 16. The modulator and precompensator circuit 16 is operative to convert serial digital signals to digital pulses, each pulse according to the invention being generated with sufficient energy to optimize slew rate between consecutive pulses as explained hereinafter. The implementation of the modulator portion of the circuit 16 would be apparent to the ordinarily skilled technician given the specification of output characteristics. The modulator/precompensator circuit 16 may optionally be under the control of a sequence controller 18. The sequence controller 18 monitors the input pattern and instructs the modulator precompensator circuit 16 as to the amount of energy, represented by amplitude, to be included in each pulse.

The output of the modulator/precompensator circuit 16 is applied to an output coupling through a pulse transformer 20 across a balanced load, including resistors R1 and R2. The pulse transformer 20 comprises a center tapped primary winding 21 with terminals 131, 133 and 134 and a pair of biased secondary windings 23 and 25, the first secondary winding being coupled to a first lead 24 of a twisted-pair cable 22 and to a negative DC bias supply (for example, −48 volts DC), and the second secondary winding being coupled to a second lead 26 of the twisted-pair cable 22 and being coupled to zero volts DC. The DC connection is for supplying power to a remote station through direct coupling. Signal coupling between the two secondary windings 23 and 25 of the pulse transformer 20 is by means of a coupling capacitor 28. Thus the AC signal is completely decoupled from a DC power supply.

Received signals applied to the twisted-pair cable 22 are routed to taps 30 and 32 on the primary winding 21 of the pulse transformer 20.

The twisted-pair cable 22 is connected to a remote transceiver (not shown). Since the receiver section of the transceiver 10 is identical, attention is directed to receiver section 33 of transceiver 10. Differential receiver elements 34 receives threshold set signals through a threshold controller 36. The threshold controller 36 may be a fixed voltage source, or it may both detect voltage level on the taps 30 and 32 and generate a voltage reference level on reference line 38. The nominal voltage reference level is preferably amplitude sensitive and referenced to the average power or amplitude between positive-going and negative-going pulses. Such threshold setting is conventional and therefore not described herein in detail as it is not pertinent to the claimed invention. Reference line 38 is coupled to reference inputs 40 and 42 of the receivers 34. The receiver element 34 generates two signals RI+ at output 44 and RI− at output 46. Outputs 44 and 46 are connected to a data recovery and synchronization logic circuit 48. The logic circuit 48 may employ an internal clock or as additional input a high frequency clock of a rate of at least six times faster than a minimal bit rate in order to drive internal timers as hereinafter explained. Logic circuit 48 is also coupled to the sequence controller 18. The implementation of the logic circuit 48 will be explained hereinafter.

Output of the data recovery and synchronization logic circuit 48 is a serial pattern representing the data recovered from alternate marked inverted (AMI) encoded data. This output is applied to a serial parallel converter 50 which in turn is applied to receive registers 52. The receive registers 52 provide, for example, eight data output lines, a frame sync line and a timing clock line which may be used for further processing in accordance with the defined packet format. The details of the packet format need not be discussed herein since the invention is directed merely to operation within limits imposed by a packet environment, namely, a ping-pong protocol requiring rapid and frequent synchronization acquisition.

Figure 4A:
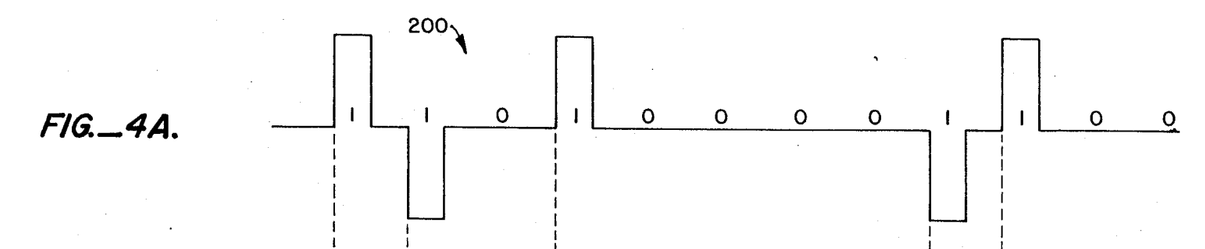
FIG. 4A is a waveform diagram of a transmitted waveform in accordance with the invention.
Figure 4B:
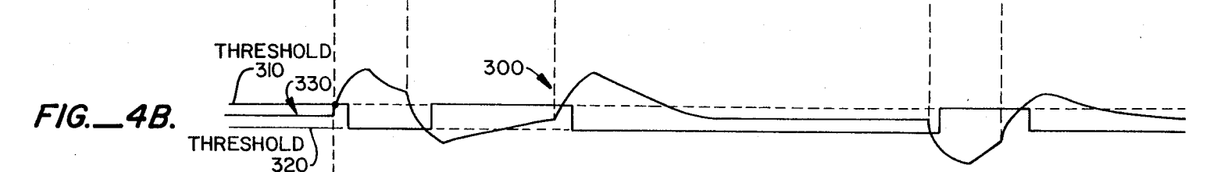
FIG. 4B is a waveform diagram showing a received waveform with a variable threshold according to the invention.
Figure 4C:
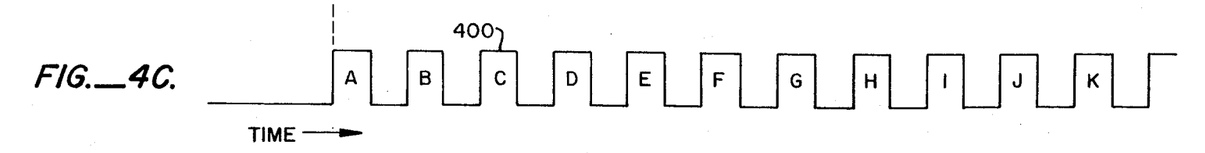
FIG. 4C is a waveform diagram which shows the data window signal during which data signals are considered valid.

It is helpful to understand the coding technique and the code recovery technique. For this purpose, reference is made to FIGS. 4A through 4C. FIGS. 4A through 4C are waveform diagrams on a common time scale representing, respectively, a transmitted waveform 200, a received waveform 300 and a data window waveform 400 employed to detect the received waveform. Underlying the data window waveform 200 is a high-speed, high precision clock signal which for example is operative at six times the rate of the signal represented by the data window waveform 400. A data window such as window A, is enabled for a period of one-half cycle. Hence, such a high-speed clock produces three complete cycles for six transitions during each data window. The number of transitions per data window represents the phase resolution as hereinafter explained.

FIG. 4A illustrates transmitted AMI encoding wherein pulses correspond to logic ONES and the absence of pulses corresponds to logic ZEROES. The pulses according to the present invention are of invariably alternate polarity. In accordance with the invention, AMI encoding herein must involve the total absence of intentional bipolar violations.

Referring to FIG. 4B, there is shown a representation of a received waveform 300, that is, a signal applied to the transmission medium which has become subject to intersymbol interference because of bandwidth limitations of the medium. If the time interval between adjacent pulses is less than the complete discharge time of a pulse applied to the transmission medium, intersymbol interference will occur. The effect shown in FIG. 4B is that of a received waveform on an exemplary twisted-pair cable at a data rate of greater than 0.5 M bit/sec. over a distance of greater than about 200 meters from a transmitter transceiver. As will be evident, the received waveform does not settle to a zero value for periods greater than the allowable time between symbols, as represented by HIGH, or ENABLED, states A, B, C, D, etc., of the data window waveform 400 (FIG. 4C).

According to the invention, therefore, a dual threshold and detecting means scheme is employed wherein the outputs (at 64 and 66 in FIG. 2) of the dual threshold detecting means (40, 42 in FIG. 1) are alternately masked or disabled in accordance with signal reception history and a knowledge that the transmitted waveform contains no bipolar violations. For example, at the outset of reception, either a threshold 310 or a threshold 320, when exceeded by energy in a received signal, would indicate reception of a pulse. In the example shown, threshold 310 is first encountered during data window state A. Circuitry as hereinafter explained disables the output of the detecting means coupled with threshold 310 (FIG. 4B) and enables the output of the detecting means coupled with threshold 320 by the time of the next data window state, data window state B. During data window state B, a pulse is detected indicating a logic ONE value. Threshold 320 is a mirror or complementary value of threshold 310 with respect to a dc reference level 330.

The threshold following data window state B inverts since a pulse has been detected. Hence, threshold 310 is reinstated during data window state C, indicating that a valid pulse must contain enough energy to overcome the effects of intersymbol interference with prior symbols. Had the threshold not been inverted during data window state C, a zero reading would have been falsely read as a pulse because of intersymbol interference. With the next occurrence of a pulse exceeding threshold 310 (during data window state D), the threshold 310 is again inverted to restore threshold 320. Threshold 310 remains masked until a negative going pulse exceeds threshold 320, which occurs during data window state I. The threshold 310 again inverts so that during data window state J, a pulse is detected. Thereafter, the threshold again inverted so that during data window state K, a false reading is avoided.

Referring to the waveform diagrams of FIGS. 4B and 4C, data window state A is synchronized to the first occurrence of the received waveform exceeding either threshold 310 or threshold 320. Hence data window state A is enabled for a predetermined period only after the occurrence of a pulse exceeding either one of the thresholds 310 or 320. The relative timing of the data window state A as well as all subsequent data window states is determined by an underlying high-speed clock. A signal exceeding either threshold 310 or threshold 320 causes data window state A to be enabled at the next transition of the underlying high-speed clock. Thus the resolution of a data window with respect to the received waveform is relative to the nearest subsequent transition of the high-speed clock. Since there are two possible transitions relative to the beginning of a data window, synchronization may either be to the threshold immediately preceding or immediately after the occurrence of a received data pulse.

The high-speed clock is preferably derived from a high precision oscillator. Synchronization of a stream of bits is frame-oriented. In the particular embodiment herein disclosed, synchronization acquisition occurs each 125 microseconds. Synchronization acquisition according to the invention is to occur at the first pulse after the beginning of each frame. If there is period of idle time of at least five microseconds, pulses will not be affected by intersymbol interference and therefore the leading edge of the first pulse in a series is used to enable the first data window. Synchronization is thereafter a matter of concern only if the local clock is operative at a clock rate which is out of intended tolerance. Moreover, it is contemplated that only a fraction of the 125 microsecond frame will be used for the transmission of information. Hence, high precision oscillators provided at each node in the system and which operate at the same nominal frequency may be used for local control of data windows. A universal clock is unnecessary so long as local clocks are synchronized to the beginning of each frame. As an example of the amount of drift which might be expected in an actual system, consider two oscillators wherein one oscillator is provided at a central switching node and the other oscillator is in a remote device at a termination node. If each of the oscillators has a precision of 50 ppm, then the maximum drift in a frame period of 125 microseconds is a mere 12.5 nanoseconds. This amount of drift is well within permissible limits for frame synchronization. In reality, accuracy is much greater because only a fraction of the 125 microsecond frame is generally used, and synchronization acquisition following a period of idle time does not occur until the actual transmission of data.

According to the invention, synchronization acquisition is achieved by the use of a shift register in connection with a high precision counter. The conventional synchronization acquisition technique has been the use of a precision phase-locked loop. The acquisition time of a phase-locked loop is substantially longer than the acquisition time of the present invention, and the precision achievable with a conventional phase-locked loop system is no greater than the precision achievable with the present invention.

Figure 2:
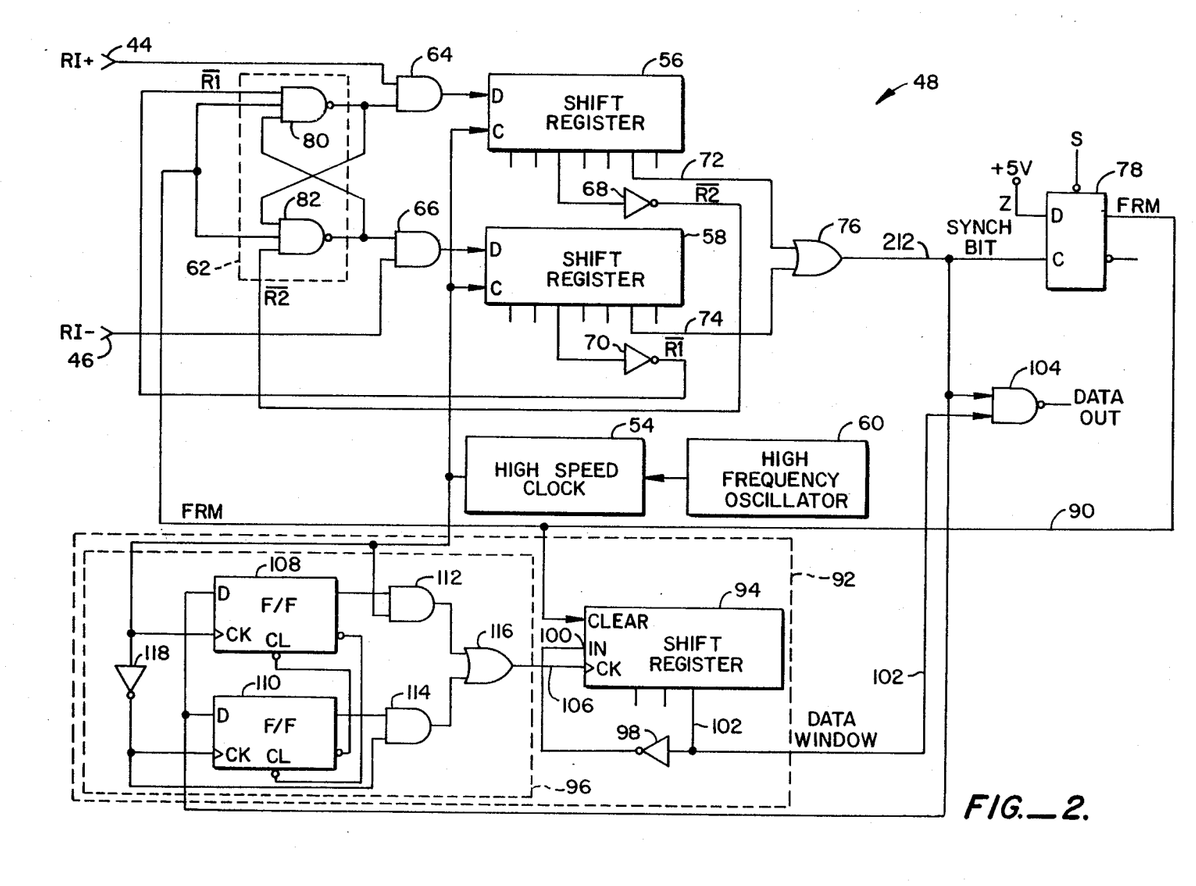
FIG. 2 is a schematic diagram of a portion of a receiver circuit according to the invention.

Reference is made to FIG. 2 which illustrates the logic circuits used to overcome intersymbol interference and to acquire synchronization. The outputs 44 and 46 of comparators 34 (FIG. 1) are inputs to the data recovery and synchronization logic 48 (FIG. 2). A high-speed clock 54 is coupled to clock inputs of first shift register 56 and second shift register 58. The high-speed clock 54 is operative at a rate preferably at least six times faster than the minimum bit rate of the data to be recovered. The high-speed clock 54 is driven by a high precision oscillator 60, as hereinabove explained. The high-speed clock 54 and the high precision oscillator 60 need not be unique to the data recovery and synchronization logic circuit 48 but may be shared with other elements of the transceiver requiring a digital clock. The logic circuit 48 further includes a bistable multivibrator or flip-flop 62, a first AND gate 64 and a second AND gate 66, each of the respective AND gates 64 and 66 having an output coupled to data inputs of shift registers 56 and 58. Each of the shift registers 56 and 58 has two outputs, a first feedback output through respective inverters 68 and 70 and a synchronization output 72 and 74 to an OR gate 76. The output of the OR gate 76 is a synchronization bit signal applied to the clock input of a flip-flop 78.

While the threshold masking operation of the logic circuit 48 of FIG. 2 would be apparent to one of ordinary skill, an explanation of operation is instructive. Before the start of the receiving phase of the logic circuit 48, a frame signal FRM on signal line 90 coupled to one of the three inputs to both NAND gates 80 and 82 forming the flip-flop 62 is preset to a logic ZERO by a set signal to the set input S of flip-flop 78. Consequently, both outputs of flip-flop 62 are set to logic ONE. The AND gates 64 and 66 will then produce an output when either input 44 or input 46 becomes active. The state of the output of AND gates 64 and 66 is shifted continuously through the shift registers 56 and 58 under control of the high-speed clock 54. At the occurrence of a signal exceeding the threshold set by threshold controller 36, either input 44 bearing signal RI+ or input 46 bearing signal RI− produces a logic ONE at the data input of one or the other of serial to parallel shift registers 56 or 58. Data will be shifted through the activated shift register until picked off by either feedback output through inverter 68 or feedback output through inverter 70, represented respectively as R2 complement or R1 complement. The R2 complement signal is fed back to the R2 complement input of NAND gate 82. The R1 complement signal is fed back to R1 complement input of NAND gate 80. The generation of these complement output signals is at a fixed finite delay following the introduction of a signal at the data input, depending on the position within the shifted register from which the data is derived.

When a signal from the signal lines 44 or 46 is applied to either of the AND gates 64 or 66, the respective signal is propagated to the input of the shift register 56 or 58, since the outputs of both NAND gates 80 and 82 are initially high. The signal is propagated through the shift register to the output tap. For example, if a signal RI+ is enabled to apply a logic ONE to the data input of the shift register 56, a signal R2 complement is generated through inverter 68 to be applied to one of the inputs of NAND gate 82. Initially, such a signal has no effect because the frame signal line 90 is at a logic ZERO level. However, the data signal in shift register 56 is further propagated to output line 212 through the OR gate 76 to the clock input of the flip-flip 78. The data input of the flip-flop 78 is preset at terminal Z to a logic ONE (+5 volts). Thus, when a logic ONE is applied at the clock input of the flip-flop 78, the output on frame line 90 changes to a logic ONE, which in turn is applied to the inputs of the NAND gates 80 and 82. As soon as the frame signal FRM on line 90 goes to a logic ONE, the output of the NAND gate 80 goes to a logic ZERO thereby causing the output of AND gate 64 to go to a logic ZERO. Therefore, according to the invention, any signal on input 44 is thereby masked from the shift register 56. Shift register 58 remains responsive to input signals applied through input 46, since the output of NAND gate 82 remains at logic level ONE so long as one input remains at logic level ZERO. In this case, the output of NAND gate 80 is cross-coupled to one of the three inputs of NAND gate 82, thereby forcing the output of NAND gate 82 to remain at a logic ONE level. After a predetermined number of cycles, the R2 complement signal reverts to a logic ONE state as the logic ZERO of the data input of shift register 56 propagates through the shift register. The logic circuit 48 then expects to receive the next pulse indicating a digital ONE at input 46. If no pulse signal is received at input 46 during the period specified for a data window, the circuitry interprets the signal as a digital ZERO. However, if a signal is applied to input 46 which is a digital ONE, such signal is propagated through the AND gate 66 to the shift register 58 which in turn after a predetermined period manifests a logic ZERO on the R1 complement output to the NAND gate 80. The NAND gate 80 is then forced to a logic ONE state which in turn forces NAND gate 82 to a logic ZERO state to mask signals applied at input 46 from the shift register 58. In this manner, the duration of each pulse is made independent of the actual duration of the pulse on the transmission medium, and the initial threshold polarity with respect to a neutral reference is determined by the initial data pulse on the transmission medium.

Referring again to FIG. 2, there is shown a data window circuit 92 in accordance with the invention. The data window circuit 92 comprises a serial to parallel shift register 94 coupled with a clock adapter circuit 96. The purpose of the clock adapter circuit 96 is to provide a clock signal at both the leading edge and the trailing edge of each output of the high-speed clock 54 in a polarity consistent with the polarity of the initial pulse and all subsequent signal pulses.

Figure 5A:
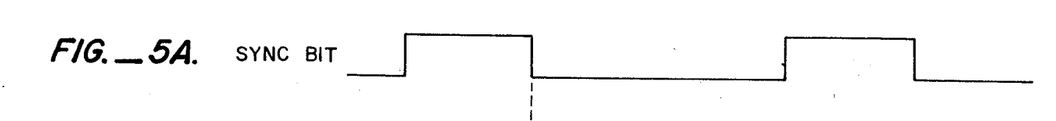
FIG. 5A is a waveform diagram showing the output waveform of the data or sync bit signal.
Figure 5B:
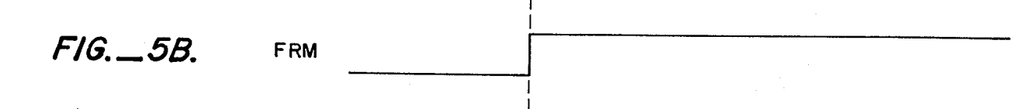
FIG. 5B is a waveform diagram showing one portion of the frame or FRM signal.
Figure 5C:
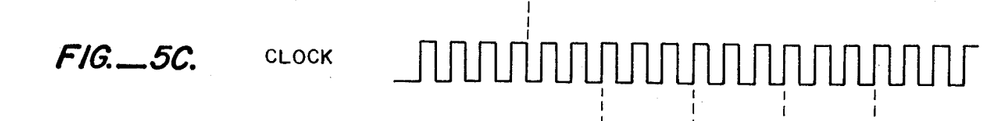
FIG. 5C is an exemplary clock signal.
Figure 5D:
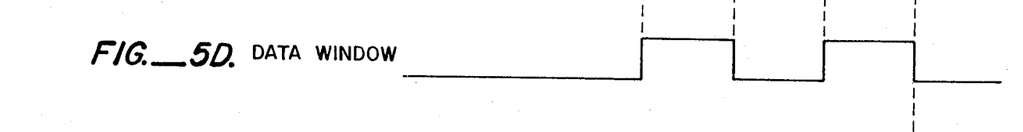
FIG. 5D is a waveform diagram of an exemplary data window signal equivalent to the waveform of FIG. 4C.
Figure 5E:
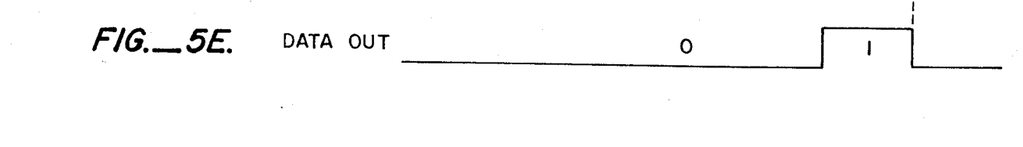
FIG. 5E is a waveform diagram representing an exemplary data output signal.

The shift register 94 is coupled to receive at its CLEAR input the frame signal FRM on line 90 and the CLOCK signal from the clock adapter circuit 96. In a specific embodiment, the third output tap of the shift register 94 is feedback coupled through an inverter 98 to input terminal 100 of the shift register 94. The output of the shift register is a data window signal on a line 102 to a dual input NAND gate 104. The NAND gate 104 receives as its other input the sync bit signal from OR gate 76. The output of the NAND gate 104 is the desired data output signal (FIG. 5E) occurring during a valid data window state (FIG. 5D). Referring particularly to FIG. 5A, 5B, 5C, 5D and 5E there is shown an example of the timing sequence associated with the shift register 94. In FIG. 5A, the sync bit signal provided as the output of OR gate 76 is shown. On the trailing edge of the sync bit signal, the frame signal is generated on line 90 (FIG. 5B). The frame signal is fed to the clear input of the shift register 94 (FIG. 2) to clear the shift register 94 of all residual data. A clock signal on a line 106 out of the clock adapter 96 produces a signal employed to drive the shift register 94. In a preferred embodiment, the shift register 94 responds to a positive leading edge clock. After a predetermined number of clock cycles, (in the particular embodiment shown here, after three cycles,) an output signal on a line 102 is provided from the shift register 94. This is the data window signal provided both to the NAND gate 104 and to the inverter 98. The output of the inverter 98 is fed back to the input 100 of the shift register 94. Referring to FIG. 5D, the data window signal is enabled in response to a positive going edge of the clock (FIG. 5C) and is disabled in response to a subsequent positive going edge. The ANDing of the data signal on the sync bit line (FIG. 5A) with the data window signal (FIG. 5B) produces an indication of the presence of a pulse (indicating a digital ONE) or produces an indication of the absence of a pulse (indicating a digital ZERO) in the received signal.

Referring with greater detail to the clock adapter 96, there is shown a first flip-flop 108 and a second flip-flop 110 having outputs coupled through AND gates 112 and 114 respectively, the outputs of which are coupled to an OR gate 116 which produces an output signal to clock line 106. The flip-flops 108 and 110 are each driven by the high-speed clock 54 in inverted relationship to one another as determined by an inverter 118. The clock 54 as inverted also drives the second input of AND gate 114. The noninverted clock signal drives the second input of AND gate 112. The data input of each of the flip-flops 108 and 110 is the sync bit signal from the OR gate 76. The complementary outputs of the flip-flops 108 and 110 are cross-coupled respectively to the CLEAR inputs of the other flip-flops 110 and 108. The circuit elements thus cooperate to provide a leading edge clock input signal in phase and synchronous with the first bit of data in each frame.

Figure 3:
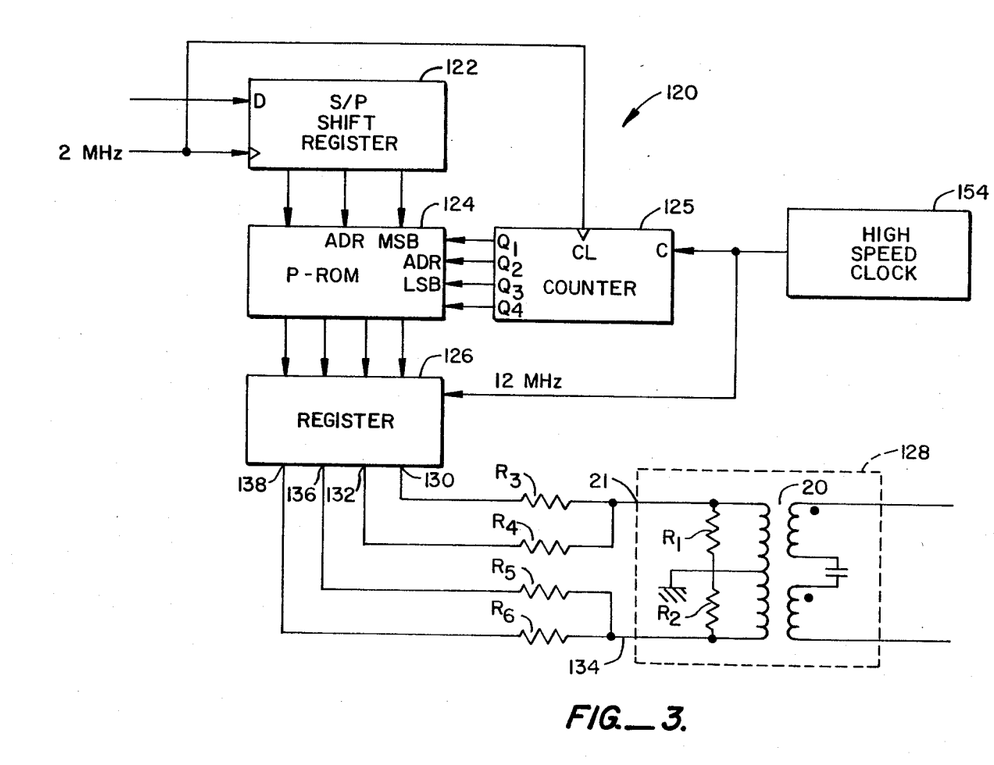
FIG. 3 is a schematic diagram of a portion of a transmitter circuit having precompensation according to the invention.

FIG. 3 shows a diagram of a precompensation circuit 120 for providing transmission precompensation in accordance with the invention as may be employed in the modulator precompensator 16 of FIG. 1. Only the precompensation circuitry 120 is of interest here as the other circuits used therein are conventional and need not be described to the ordinarily skilled technician. Precompensation circuitry 120 constructed in accordance with the invention is for the purpose of transmitting pulses in such a way that the effect of intersymbol interference produces a minimal effect on data recovery at the receiving end of a transmission medium such as a twisted-pair cable. Precompensation is implemented in a bit-by-bit fashion to maximize intersymbol slew rate by taking into consideration the previous two transmitted bits and applying a precompensation signal to the next subsequent bit based on a knowledge of the pattern of the previous two bits. Referring in particular to the elements of FIG. 3, data is received from a previous stage in a serial to parallel shift register 122, the output of which is coupled in parallel to the most significant (MSB) address inputs of a programable read only memory (PROM) 124. Least significant bit (LSB) addresses are provided through a counter driven by a local high frequency clock 154. The local high frequency clock 154 is preferably the same clock as used elsewhere in the receiver. The output of the PROM 124 is preferably at least three data bit lines coupled to a shift register 126. The data output thus provides options for eight definable dynamic levels and durations for use in subsequent processing. Specifically, the register 126 is a shift register operative as a latch wherein data from PROM 124 is loaded, the output terminals of which are each coupled to drive loading resistors 128 supplying pulses to the pulse transformer 20 (FIG. 1). (The pulse transformer in FIG. 3 is shown merely for clarity and is not part of the precompensator circuit 16.)

In a particular embodiment, the register 126 provides four outputs, each output tied through a resistor R3, R4, R5, R6, one terminal of each resistor being coupled to one or the other of the primary input terminals of the pulse transformer 20. Specifically, a first output resistor R3 is coupled between the first input 21 of the primary winding of the pulse transformer 20 and a first output 130 of the register 126. A second output resistor R4 is coupled between input 21 and a second register output 132. A third resistor R5 is coupled between input terminal or tap 134 of the transformer 20 and a third output 136 of the register 126. A fourth output resistor R6 is coupled between the input tap 134 and a fourth output 138 of the register 126. Resistor R3 is preferably of the same value as resistor R5, and resistor R4 is preferably of the same value as resistor R6 in order to preserve balance across the primary winding of the transformer 20.

The precompensation circuit 120 operates as follows:

At the beginning of a cycle, a two MHz or other data speed clock clears the counter 125 to zero count and begins to clock data to the serial to parallel shift register 122. A high frequency clock 154 clocks the counter 125 at a rate which is a multiple of the two MHz input clock causing the least significant bit (LSB) addresses in the ROM 124 to access stored data regarding pulse duration and amplitude.

With appropriate subsequent clock pulses of the two MHz clock to the shift register 122, the data applied to the shift register 122 is fed to the most significant bit (MSB) addresses of the ROM 124. Subsequent clocks will shift the data through the shift register 124 thereby changing the MSB bit pattern of the address portion of the ROM 124. Thus the input data is used to select sectors of the ROM 124 for accessing data in accordance with a sequence of counts generated by the counter 125. Data contained in each of the ROM sectors is preselected for timing and amplitude characteristics determinative of desired compensation effects to be applied to the output network of the transmitter. For example, one or more sectors may contain null data, another sector may contain data representing specific lengths and pulse amplitude combinations (pulse shape). Sectors are addressed based on the current and immediately preceding historic combination of bits applied to the data input of the shift register 122. For example, for input data represented by three consecutive ones, a sector would be addressed which would allow the least significant bits to address data representing a data pattern representing a high amplitude relatively short pulse. Signals would be applied to the resistors R3, R4, R5 and R6 in the combination specifying maximum amplitude. The pulse would be terminated by null data at the last address locations in the addressed sector. Analog signals would be applied for a time dependent on the number of non-null bit contained in the addressed sector.

A precompensation scheme according to the invention is based on a digital pattern intended to increase slew rate by increasing maximum amplitude and minimizing pulse length based on immediately prior history of pulses. A three level logic decision is made.

Figure 6A:
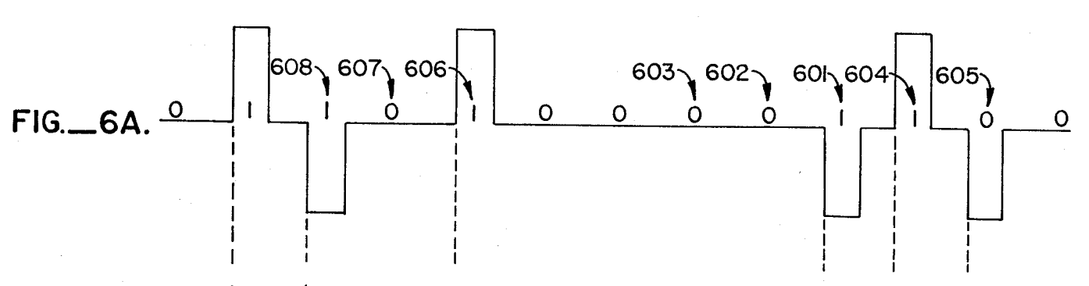
FIG. 6A is a waveform diagram similar to FIG. 4A of a signal without precompensation.
Figure 6B:
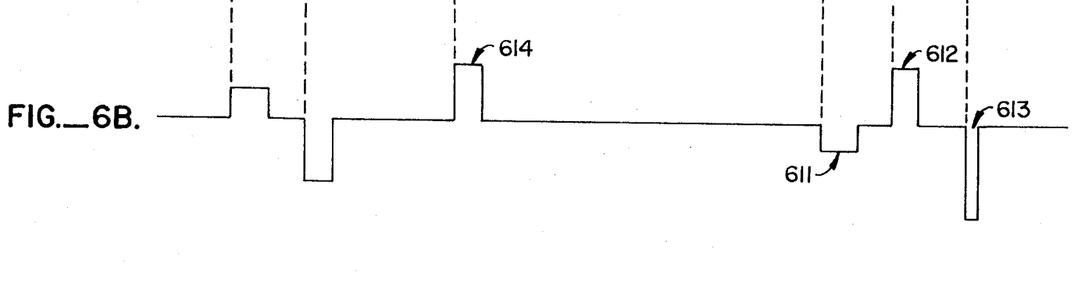
FIG. 6B is a waveform diagram in time alignment with FIG. 6A illustrating a transmitted signal with (AMI) precompensation according to the invention.

A pattern for transmission of AMI signals according to a specific embodiment of the invention herein is shown in FIG. 6A and FIG. 6B as follows:

If the current transmitted bit 601 is a one (a pulse) and the immediately preceding two bits 602 and 603 are zeros (no pulses), the pulse 611, generated by the ROM data is a low amplitude pattern having a long duration. If the current transmitted block 604 is one, the first immediately preceding bit 601 is one, and the second immediately preceding bit 602 is zero, then the pulse 612 presented at presented by the ROM-stored data bits is a medium amplitude pattern having a medium duration. If the current transmitted bit 605 is a one, and two or more immediately preceding bits 604, 601 are one, then the pulse 613 presented by the ROM-stored data bits is a high amplitude relatively short pulse. If the current bit 606 is one, the immediately preceding bit 607 is a zero, and the second immediately preceding bit 608 is a one, the pulse 614 generated by the ROM data is a medium amplitude pattern of intermediate length. The object is to provide the same total energy in each pulse, and as such each pulse has the same amplitude-duration product.

The invention has now been explained with reference to specific embodiments. Other embodiments will be apparent to one of ordinary skill in this art. It is therefore not intended that this invention be limited except as indicated by the appended claims.

I claim:

1. An apparatus for transmission and reception of digital data over a bandlimited channel comprising:
    means for generating and transmitting a pure alternate mark invert pulse code (pure AMIPC) signal from a digital message signal, said pure AMIPC signal being free of bipolar violations; and
    means for receiving a signal representative of said pure AMIPC signal, said receiving means including means defining a first threshold and a second threshold, said first threshold for identifying positive polarity pulses of said pure AMIPC signal, and said second threshold for identifying negative polarity pulses of said pure AMIPC signal, said first threshold and said second threshold being substantially equal in amplitude, first detecting means coupled to said threshold defining means for only detecting a signal of an amplitude greater than said first threshold, second detecting means coupled to said threshold defining means for only detecting a signal of an amplitude greater than said second threshold, means for simultaneously enabling said first detecting means and said second detecting means until receipt of a first representative signal of arbitrary polarity, said enabling means also for disabling said first detecting means upon receipt of a representative signal of positive polarity until receipt of a representative signal of negative polarity and for disabling said second detecting means upon receipt of a representative signal of negative polarity until receipt of a representative signal of positive polarity and timing means, for establishing a pulse duration of a reconstructed pulse for each said representative signal of positive polarity and negative polarity, said pulse duration being independent of duration of representative signal in order to minimize effects of intersymbol interference.

2. An apparatus for transmitting and receiving digital data over a bandlimited channel comprising:
    means for generating and transmitting a pure alternate mark invert pulse code signal from a digital message signal, said pure alternate mark invert pulse code signals being free of bipolar violations, said generating and transmitting means including means for specifying discrete values for amplitude and duration of generated pulses of said pure alternate mark invert pulse code signal prior to transmission in response to the sequence of binary digital values of preceding generated pulses, said adjusting means constraining each of said generated pulses to consist of a substantially equal amount of energy, for suppressing the effects of intersymbol interference on a signal received as a representation of a sequence of pulses at a receiving means and for simplifying detection; and
    means for receiving and detecting alternate mark invert code pulse signals to recover said digital message.

3. The apparatus according to claim 1 wherein said generating and transmitting means includes means for specifying discrete values for amplitude and duration of generated pulses of pure alternate mark inverted pulse code signals, said specifying means constraining each of said generated pulses to contain a substantially equal amount of energy in response to the sequence of binary digital values of preceding message signals in order to minimize effects of intersymbol interference in received signals.

4. The apparatus according to claim 3 wherein said specifying means comprises means operative to select said amplitude and duration value of each transmitted pulse signal to maximize slew rate while maintaining approximately equal energy content among pulses.

5. The apparatus according to claim 3 wherein said specifying means comprises:
    a shift register for receiving said message signals;
    a programmable read only memory means coupled to receive outputs of said shift register as most significant bits of addresses for selecting sectors of said memory means;
    a digital counter coupled to least significant bits of addresses of said memory means for generating a sequence of addresses to read out data in sectors selected by message signals to said shift register; and
    means for converting said data from said sectors of said memory means to analog signals of substantially discrete amplitude and substantially discrete duration determined by said data.

6. The apparatus according to claim 1 further including means for selecting polarity of a local high-speed clock in response to polarity of the first pulse of said representative pulse signals.

7. The apparatus according to claim 1 further including data window means for detecting for presence or absence of said reconstructed pulse indicating a logic one or logic zero, respectively, in order to reconstruct the digital message of said digital message signal.

8. The apparatus according to claim 1, 2, 3, 4, or 5 wherein said receiving means includes digital means for acquiring synchronization of data windows to each first one of said received pulse signals, said received pulse signals being in a packet format of limited duration, said synchronization acquiring means including a local high precision clock for maintaining synchronization for said limited duration.

* * * * *